United States Patent [19]

Fennell et al.

[11] 3,898,323

[45] *Aug. 5, 1975

[54] TASTE MODIFYING COMPOSITION

[75] Inventors: J. Richard Fennell; Robert J. Harvey, both of Sudbury, Mass.

[73] Assignee: Mirlin Corporation, Wayland, Mass.

[ * ] Notice: The portion of the term of this patent subsequent to May 30, 1989, has been disclaimed.

[22] Filed: Apr. 1, 1971

[21] Appl. No.: 130,456

Related U.S. Application Data

[63] Continuation-in-part of Ser. No. 28,961, April 15, 1970, abandoned.

[52] U.S. Cl. .................................. 424/44; 424/195
[51] Int. Cl.$^2$ ..................... A61K 9/00; A61K 27/00
[58] Field of Search ................. 424/16, 43, 195, 44; 99/140 R; 426/191, 217

[56] References Cited

UNITED STATES PATENTS

| | | | |
|---|---|---|---|
| 536,155 | 3/1895 | Noyes | 424/16 |
| 1,450,865 | 4/1923 | Pele | 424/44 |
| 3,272,704 | 9/1966 | Beekman | 424/156 X |
| 3,676,149 | 7/1972 | Fennell et al. | 99/140 R |

FOREIGN PATENTS OR APPLICATIONS

| | | | |
|---|---|---|---|
| 589,019 | 12/1959 | Canada | 426/217 |

OTHER PUBLICATIONS

Endicott et al., Drug & Cosmetic Industry, Vol. 85, No. 2, Aug. 1959, pages 176 & 177.
Inglett et al., J. Agr. Food Chem., Vol. 13, No. 3, pp. 284–287, 1965.
Remington's Pharmaceutical Sciences, 13th Ed., pp. 564, 595–596, Mack Publishing Co., Pa., 1965.

*Primary Examiner*—Sam Rosen

[57] ABSTRACT

A composition for rendering sour tasting foods sweet tasting, comprising miraculin glycoprotein obtained from the ripe fruit of *Synsepalum dulcificum* Daniell, Sapotaceae and a non-toxic alkaline material. The composition is placed in the mouth allowing the alkaline therein to neutralize excessive mouth acids and the miraculin therein to coat the tongue. Sour food ingested within 1 to 2 hours after ingesting the composition tastes sweet. The alkaline material can be employed to minimize the amount of miraculin required and reduces variation in the magnitude and duration of the sweeting effect between individual users, or it can be employed to effect effervesence when reacted with a non-toxic organic acid and water thereby causing more rapid and effective contact of the stable miraculin with the tongue.

14 Claims, No Drawings

3,898,323

TASTE MODIFYING COMPOSITION

COMPOSITION FOR MODIFYING SOUR TASTE

This application is a continuation-in-part of application Ser. No. 28,961 filed Apr. 15, 1970, now abandoned.

This invention relates to a composition comprising stable miraculin and a non-toxic alkaline material.

*Synsepalum dulcificum* Daniell, Sapotaceae is a plant indigenous to West-Central Africa which bears a red ellipsoid fruit commonly known as "miracle fruit". The fruit has a palatable pulp and skin and contains a large seed. It is well-recognized for over 200 years, of modifying the sweet and sour tastes in an unusual manner. It has been found that a component in the fruit depresses or masks the sour taste and accentuates the sweet taste of any normally sour food eaten within a short period after first contacting the tongue with the pulp of fresh miracle fruit, thus causing the normally sour food to taste pleasantly sweet. By exposing the taste receptors on the tongue to miracle fruit, any sour tasting food can be made to taste sweet without the addition of sugar or artificial sweeteners. For example, fresh lemon can be made to taste pleasantly sweet by first eating a miracle fruit berry. The tastemodifying principle in the miracle fruit berry known as miraculin binds itself to the taste-receptors thus altering the sensory perception of the sour taste in foods eaten after the miracle fruit.

It has been determined that this miraculin is a glycoprotein having a molecular weight of about 44,000. A wide variety of approaches have been explored in attempts to isolate the active component in miracle fruit for subsequent use as a taste-modifying material. These attempts have met with only limited success since the form of the product obtained by these methods is less effective than the natural fruit, and was found to be highly unstable at normal room temperatures under normal atmospheric conditions. This necessitated either very quick use after isolation or storage at very low temperatures. This instability is not confined to the concentrates obtained by present processes but is also a characteristic of the fruit itself. The fruit must be consumed within a very short period after picking or it will be ineffective in modifying sour taste.

The prior art has regarded miraculin as a very labile material accounting for the observed instability of concentrates maintained at normal room temperatures. While some degree of success has been attained in improving stability of the miraculincontaining material in the order of about a week or so, it has been found that its stability could not be achieved when maintained in powder form at room temperatures. Alternatively, the miraculin-containing material was dissolved in specific solvents maintained at a specific pH. These solutions had to be refrigerated to be preserved, and even then this material was not as effective as the natural fruit.

The miraculin is present in the pulp and on the inner surface of the skin of the miracle fruit and in its natural environment is quickly deactivated especially when exposed to the air once the skin is broken at room temperatures. Furthermore, after the fruit has been picked, even prior to breaking the skin, the active material begins to degrade but at a slower rate than when the skin is broken. While the process by which degradation proceeds is not known exactly, it is now believed that certain enzymes and/or acids present in the fruit accelerate degradation in the presence of air at normal room temperatures, and apparently even at temperatures below the freezing point of water. It has been found that when the pulp of miracle fruit is frozen and subsequently lyophilized to form a granular or powder material, the product had to be refrozen or stored in a dry atmosphere in order to maintain the activity of the material that remained. Even when the pulp had been lyophilized, its effectiveness was not nearly as great, either on a weight basis or on a quality basis, as the active principle in the fresh fruit.

A novel powdered form of the glycoprotein active principle from miracle fruit which is stable for long periods of time of a year or more at normal room condition and its method of preparation is disclosed in application Ser. No. 28,981 filed Apr. 15, 1970 in the names of Robert J. Harvey and J. Richard Fennell.

The product disclosed in the application Ser. No. 28,981 is stable miraculin, either alone or admixed with material inert with respect to the characteristic of suppressing sour taste but excluding components that degrade miraculin present in the pulp and skin of miracle fruit including the material containing acids and/or enzymes that degrade miraculin. The product exhibits remarkable stability in powdered form at room temperature. This is indeed surprising in view of the prior art which regarded miraculin to be highly unstable and thermolabile such that it was thought necessary to maintain powdered concentrates in a frozen condition or in a dry atmosphere or to refrigerate solutions of miraculin material obtained by the prior art processes to retain the desired stability over reasonably long periods of time.

The stability of the powdered product obtained by the process disclosed in the application Ser. No. 28,981 facilitates formation of unit dosage forms therefrom. However, the unit dosage varies depending on the pH of the user's saliva. Therefore, in order to ensure the effectiveness of the unit dosage, relatively high concentrations of the active principle are required. Accordingly, it would be desirable to provide compositions, particularly unit dosage forms of the active material, which provide the desired taste-modifying affect with a minimum concentration of the active material and without a wide variance in effect and duration between individual users. In addition, it would be desirable to provide a means for quickly contacting the tongue with miraculin in order for the effect to become immediately effective, and to prevent the unnecessary loss of miraculin due the entrapment of the small particles of miraculin in larger, undissolved agglomerations of the unit dose form, which are swallowed without having been masticated.

In accordance with this invention there is provided a composition comprising miraculin, particularly the stable form of miraculin and a non-toxic alkaline material. The composition can be powdered, liquid or formed into a tablet. The tablet is composed of a core comprising the active material and a non-toxic inert binder with the alkaline material forming a coating or being admixed in the core. In one aspect of this invention, a non-toxic organic acid is admixed with the alkaline material so that when the acid-alkaline composition is dissolved in water, it effervesces, thereby providing a means for quickly dispersing the miraculin over the tongue. The composition of this invention provides the desired taste-modifying affect with a minimum concentration of active principle. Essentially all of the miraculin becomes available to bind at the taste receptor sites, and also excessive acidity in the mouth is neutralized prior to exposing the active principle to the taste receptors.

The amount of alkaline used is that sufficient to neutralize the acid in the mouth before a substantial portion of the miraculin has contacted the acid prior to being bound to the taste receptors. A tablet coated with alkaline material having a core comprising miraculin is the most efficient form for effecting the desired result of neutralization followed by contact of the taste receptor with unreacted miraculin.

In the coated tablet form or powdered form, the alkaline material comprises about 1 to 100 parts per part miraculin by weight. The alkaline material can form a coating for the tablet or can be admixed in the tablet core with miraculin or can be utilized in the coating and core. The alkaline coating is formed by tumbling the miraculin core in a drum containing an alkaline material or into which the said alkaline material is sprayed. Alternatively, the coating can be applied by compression over the tablet core utilizing a tablet press for the coating application. In forming tablets, a binder such as lactose, sorbitol gelatin, starch, acacia or the like can be employed when desired.

The inert binder employed depends upon whether it is desired to form a chewable tablet or a lozenge. Higher concentrations of binder are used to form chewable lozenge tablets.

When the alkaline-miraculin composition is a solution, the relative amounts of miraculin and alkaline material is measured conveniently by pH. Miraculin is dissolved in water at a pH above about 10.5 pH. The pH of the solution then is reduced to about 7.1 to 7.5 to render the resultant solution relatively palatable for use as a mouth rinse. Even though dissolution of the miraculin is accomplished with difficulty at pH 7.5, when it is dissolved initially at a pH above 10.5 followed by pH reduction, the miraculin remains in solution.

Suitable non-toxic alkaline materials that can be employed herein include magnesium carbonate, sodium bicarbonate, aluminum trisilicate, aluminum hydroxide complexes such as aluminum hydroxide-magnesium carbonate codried gels, calcium carbonate, aluminum hydroxide or mixtures thereof. Usually the alkaline materials are employed in tablets in amounts of between 10 and 500 milligrams.

The powdered miraculin either in the powdered form or in the tablet has an average particle size of about 50 to 1000 microns. It is preferred to minimize the average particle size of the active material since it has been found that an even greater reduction of the effective unit dose of active material is obtained thereby. The amount of miraculin in tablets is greater than about 1.0 milligrams and usually is between about 5 and 60 milligrams. While more miraculin than set forth above can be incorporated in each unit dosage form, it is unnecessary to do so in order to obtain the desired taste-modifying affect.

In the preferred embodiment of this invention, alkaline material containing effervescent compositions are formed. These compositions are effervesced by the contact in an aqueous solution of a non-toxic acid, and an alkaline material spontaneously evolves carbon dioxide when dissolved in an acidic aqueous solution. The source of the water needed for reaction can be the liquid being drunk after the composition is placed on the tongue. The acid can be either incorporated in the effervescent composition or form part of the liquid being drunk. For example, carbonated liquids contain carbonic acid which will react with sodium bicarbonate and water to form carbon dioxide. Thus, in this example, it would not be necessary to incorporate an acid when employing sodium bicarbonate in the miraculin-containing composition. On the other hand, when the liquid being drunk contains little or no acid, the acidic component can be incorporated into the miraculin-containing composition. The acid employed in the miraculin-containing composition, is a non-toxic organic acid that does not degrade the miraculin when dry. Suitable organic acids include, ascorbic acid, citric acid, fumaric acid or adipic acid. The effervescent alkaline or alkaline plus acid material is employed in amounts of between about 5 and 50 percent by weight. Less than 5 percent by weight results in little or no effective effervescence while above about 50 percent by weight results in an undesirable tactile effect on the tongue and an undesirable salty taste. The binder when employed can comprise about 5 to about 20 weight percent. The miraculin comprises the remainder of the effervescent composition, preferably about 55 to 65 weight percent. The effervescent composition preferably comprises either a homogeneous mixed powder or a tablet. When employing an acid in the effervescent composition, it is sealed in a moisture-proof wrapping material such as aluminum foil or Saran to prevent premature reaction thereof. Also, it is preferred to seal the effervescent composition not containing acid in a moisture-proof container, however, it is not nearly as critical.

In another embodiment, this invention provides a means for producing a sweet taste in the tablet being consumed without requiring the addition of sugar or other sweeteners. An excess amount of acid can be added over and above that required for producing effervescence. Once the miraculin becomes effective after the effervescence, the excess acid will produce a sweet taste. This can be used in the tablet containing miraculin for the purposes of applying or this embodiment can be used directly as a confection in which the purpose of the miraculin is solely to act as a sweetener for the confection itself rather than to sweeten foods eaten subsequently.

To attain this sweetening effect, sufficient excess acid in the tablet should be employed to attain an effective acid molarity of between 0.005 milligrams and 0.03 milligrams. By "effective molarity" is meant the amount of excess acid in the tablet which produces the same sweetening effect in an aqueous acid solution having the molarity set forth above. This definition accounts for the solubility variations among acids. For example, citric acid is quickly solubilized in aqueous solution while fumaric acid dissolves slowly in aqueous solutions.

The following examples illustrate the present invention and are not intended to limit the same.

EXAMPLE I

A powdered mixture of sodium bicarbonate and stable miraculin is prepared by the following procedure:

The fruit is depitted at about 1–4°C. in a juicer comprising a perforated cylinder housing a rotating brush extending along the cylinder length the ends of which contact the inside cylinder wall. During rotation, the brushes tumble and press the berries against the perforated housing causing the juice and pulp material to pass through the holes, leaving the pits in the cylinder. The juice and pulp flow into containers immersed in an alcohol-dry ice bath a small amount of crushed dryic (solid $CO_2$) is added directly to the fruit pulp obtained from the depitting step, and the mixture is thoroughly ground in a ball mill to a particle size of less than 150 microns (No. 100 sieve size) while being maintained at a temperature of about $-40°$ to $-50°C$.

The powdered frozen pulp and juice of the berries are added to an aqueous solution of sodium bicarbonate, pH 7.8.

The mixture then is placed in a freeze-drying flask, placed in a shell freezer, and allowed to come to thermal equilibrium at a temperature of about $-55°C$. The material is then connected to a freeze-dryer vacuum system with a refrigerated condenser for condensing liquids and condensable vapors where it remains until there is no significant weight change in the material over a 4-hour period. The material is then removed from the flask and placed in a desiccator cabinet in trays at room temperature for further drying or storage until the moisture content is between 0.5 and 1 percent. The powder and sodium bicarbonate comprise a homogeneous mixture.

After the powder is thoroughly dry, it is placed in a temperature controlled milling machine, where the average particle size is reduced preferably to about 150 microns. The material is periodically screened and that retained by the No. 100 sieve is returned to the milling machine until it can pass the No. 100 sieve size.

The fine powder is introduced into a pneumatic cyclone-type separator, whereby the dense miraculin and associated sodium bicarbonate is concentrated near the inside wall and the cellulosic material and associated sodium bicarbonate is concentrated closer to the center of the cyclone. The mixture to be separated is introduced into the top of the cyclone and caused to move in a circular path down the inside wall. The miraculin-rich material is separated from the lower density material by a baffle located at the interface of the miraculin and lower density material. The lower density material is recycled until substantially all the miraculin is separated. The concentrated miraculin sodium bicarbonate can be recycled if necessary, to achieve any degree of separation from the lower density material. The miraculin-sodium bicarbonate obtained from the cyclone separator is room temperature stable even when stored in the open atmosphere for at least about 8 months and can then be used to produce unit dose forms including tablets or aqueous sprays.

EXAMPLE II

This example illustrates a typical miraculin-sodium bicarbonate formulation, and a method for preparing chewable tablets therefrom.

The formulation used to make the tablets is set forth in Table I.

Table I

| IDENTIFICATION | AMOUNT |
| --- | --- |
| Lactose, Direct Tableting Grade | 248.3mg. |
| Sorbitol, Direct Tableting Grade | 80.0mg |

Table I-Continued

| IDENTIFICATION | AMOUNT |
| --- | --- |
| Flavoring | 7.0mg. |
| Coloring | 0.7mg. |
| Magnesium Stearate | 13.0mg. |
| Sodium Bicarbonate | 150.0mg. |
| | 549.0mg. per tablet |

The following procedure was carried out at a temperature of $68°-75°F$. with relative humidity of less than 50% to prepare the tablets. The ingredients set forth in Table I were mixed and blended with miraculin prepared as described In Example I at a concentration of 50 milligrams miraculin per tablet. The result of the mixture was screened to pass through a No. 20 sieve size. The tablets were made by pressing the formulation in a Stokes Rotary Tablet Press (B2) using a standard 12/32 inches concave punch.

EXAMPLE III

An effervescent miraculin composition was prepared by first forming a slurry of ascorbic acid and sodium bicarbonate in the following proportion:

Table II

| Composition A | |
| --- | --- |
| Ascorbic Acid | 176.12 grams (1 mole) |
| Sodium Bicarbonate | 168.04 grams (2 moles) |

Composition A was dissolved in dry ethyl alcohol. The resultant slurry was admixed with 646 grams stable miraculin prepared in the manner disclosed in copending application Ser. No. 28,981, referred to above, and 58 grams of a binder comprising Maltrin-10 which is essentially a starch. After the components were thoroughly mixed, the alcohol was evaporated by heating the resultant mixture to a temperature to about $50°C$. in a dry atmosphere. Unit dosage forms of the resultant composition then were individually sealed in a moisture-proof wrapping.

EXAMPLE IV

An effervescent coating for use with an acid-containing liquid is prepared by admixing an aqueous solution of 15wt. percent sodium bicarbonate with 65 wt. percent stable miraculin and 20 wt. percent of a binder comprising Maltrin-10. After being thoroughly mixed, the water was evaporated by heating the resultant mixture in a dry-air atmosphere to a temperature to about $50°-60°C$. Unit doosage forms of the resultant dry mixture were then individually sealed in a moisture-proof wrapping.

We claim:

1. A composition consisting essentially of:
   solid particulate material consisting essentially of the taste-modifying principle for suppressing sour taste and enhancing sweet and salt taste found in and obtained from the ripe fruit of Synsepalum dulcificum Daniell, which material retains its taste-modifying characteristics at normal room temperatures for long periods and is substantially free of the components of the ripe fruit that degrade the taste-modifying principle; and,
   an effervescent material consisting essentially of a non-toxic alkaline and a non-toxic organic acid, said particulate material and said effervescent material being admixed together, said effervescent material being between 5 and 50 weight percent of said composition, and said alkaline and said acid being capable of reacting to form carbon dioxide when in aqueous solution.

2. The composition of claim 1 wherein said particulate material is between 55 and 65 weight percent of said composition.

3. A tablet consisting essentially of the composition of claim 1 wherein said composition includes greater than 5 weight percent of a binder inert with respect to effervescent material and said particulate material, said tablet including an amount of said particulate material containing said principle in quantity and quality sufficient to modify the taste receptors of the mouth.

4. The table of claim 3 wherein said amount is not less than 10 milligrams of said particulate material.

5. The tablet of claim 4 including less than 60 milligrams of said particulate material.

6. A sealed, moisture proof wrapping containing the tablet of claim 3.

7. The composition of claim 1 wherein said alkaline is sodium bicarbonate and said acid is ascorbic acid.

8. A dry composition consisting essentially of:

solid particulate material consisting essentially of the taste-modifying principle for suppressing sour taste and enhancing sweet and salt taste found in and obtained from the ripe fruit of Synsepalum dulcificum Daniell, which material retains its taste-modifying characteristics at normal room temperatures for long periods and is substantially free of the components of the ripe fruit that degrade the taste-modifyiing principle; and, an effervescent material including a non-toxic alkaline, said particulate material and said effervescent material being admixed together, said effervescent material being between 5 and 50 weight percent of said composition, and said alkaline being capable of forming carbon dioxide when dissolved in an acidic aqueous solution.

9. The composition of claim 8 wherein said particulate material is between 55 and 65 weight percent of said composition.

10. A tablet consisting essentially of the composition of claim 8 wherein said composition includes greater than 5 weight percent of a binder inert with respect to effervescent material and said particulate material, said tablet including an amount of said particulate material containing said principle in quantity and quality sufficient to modify the taste receptors of the mouth.

11. The tablet of claim 10 wherein said amount is not less than 5 milligrams of said particulate material.

12. The tablet of claim 11 including less than 60 milligrams of said particulate material.

13. A sealed, moisture proof wrapping containing the tablet of claim 10.

14. The composition of claim 8 wherein said alkaline is sodium bicarbonate.

* * * * *